United States Patent
Ahmed et al.

(10) Patent No.: US 7,216,719 B2
(45) Date of Patent: *May 15, 2007

(54) FIELD WELDABLE CONNECTIONS

(75) Inventors: Hebah Ahmed, Houston, TX (US); Harjit S. Kohli, Sugar Land, TX (US); Ben A. Donnell, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/805,897

(22) Filed: Mar. 22, 2004

(65) Prior Publication Data

US 2004/0173359 A1    Sep. 9, 2004

Related U.S. Application Data

(63) Continuation of application No. 09/970,353, filed on Oct. 3, 2001, now Pat. No. 6,886,638.

(51) Int. Cl.
*E21B 41/00*    (2006.01)
*H02G 3/06*    (2006.01)

(52) U.S. Cl. ............... 166/385; 166/65.1; 166/242.6; 174/88 R; 174/110 E; 174/110 SR

(58) Field of Classification Search ............... 166/385, 166/373, 65.1, 169, 242.3, 242.6; 174/74 R, 174/77 R, 79, 84 R, 85, 88 R, 88 C, 91, 174/92; 403/286, 293
See application file for complete search history.

(56) References Cited

U.S. PATENT DOCUMENTS

| | | | | |
|---|---|---|---|---|
| 2,463,231 A | * | 3/1949 | Wyatt .................. | 156/49 |
| 2,640,095 A | * | 5/1953 | Lewis et al. .......... | 174/88 C |
| 3,145,241 A | * | 8/1964 | Powell ................. | 264/76 |
| 3,691,291 A | * | 9/1972 | Taj ..................... | 174/73.1 |
| 3,717,717 A | * | 2/1973 | Cunningham et al. .... | 174/73.1 |
| 3,777,048 A | * | 12/1973 | Traut .................. | 174/73.1 |
| 3,808,353 A | * | 4/1974 | Burtelson ............. | 174/92 |
| 3,816,639 A | * | 6/1974 | Anderson et al. ...... | 174/73.1 |
| 3,826,860 A | * | 7/1974 | De Sio et al. ........ | 174/73.1 |
| 3,846,578 A | * | 11/1974 | Bahder et al. ........ | 174/88 R |
| 4,054,743 A | * | 10/1977 | Mayer et al. ......... | 174/135 |
| 4,317,003 A | * | 2/1982 | Gray ................... | 174/106 R |
| 4,354,053 A | * | 10/1982 | Gold .................. | 174/84 R |
| 4,403,110 A | * | 9/1983 | Morrisette ............ | 174/84 R |
| 4,408,092 A | * | 10/1983 | Eatwell et al. ....... | 174/88 R |
| 4,484,022 A | * | 11/1984 | Eilentropp ............ | 174/84 R |

(Continued)

FOREIGN PATENT DOCUMENTS

DE    4413180 A1 *    10/1995

(Continued)

*Primary Examiner*—Jennifer H Gay
(74) *Attorney, Agent, or Firm*—Fred G. Pruner; Dona C. Edwards; Jaime A. Castano

(57) ABSTRACT

An apparatus includes a weld coupling and a thermal insulator. The weld coupling is adapted to be welded to an outer housing of a first cable segment to couple the first cable segment to a second cable segment. The thermal insulator is adapted to prevent thermal damage to a communication line of the first cable segment when the weld coupling is welded to the outer housing.

19 Claims, 7 Drawing Sheets

U.S. PATENT DOCUMENTS

| | | | |
|---|---|---|---|
| 4,501,927 A * | 2/1985 | Sievert | 174/93 |
| 4,549,039 A * | 10/1985 | Charlebois et al. | 174/72 R |
| 4,570,715 A * | 2/1986 | Van Meurs et al. | 166/302 |
| 4,572,299 A * | 2/1986 | Vanegmond et al. | 166/385 |
| 4,580,874 A * | 4/1986 | Winter et al. | 385/99 |
| 4,627,490 A * | 12/1986 | Moore | 166/65.1 |
| 4,839,470 A * | 6/1989 | Ventura | 174/84 R |
| 4,943,685 A * | 7/1990 | Reynaert | 174/19 |
| 4,968,857 A * | 11/1990 | McGrane | 174/84 C |
| 4,976,796 A * | 12/1990 | Feitzelmayer | 156/49 |
| 5,006,286 A * | 4/1991 | Dery et al. | 264/408 |
| 5,217,075 A * | 6/1993 | Wittrisch | 166/302 |
| 5,315,065 A * | 5/1994 | O'Donovan | 174/84 C |
| 5,509,202 A * | 4/1996 | Abdow | 29/871 |
| 5,762,135 A * | 6/1998 | Moore | 166/65.1 |
| 5,775,702 A * | 7/1998 | Laeremans et al. | 277/314 |
| 5,804,767 A * | 9/1998 | Winfield et al. | 174/74 R |
| 6,202,743 B1 * | 3/2001 | Moore | 166/65.1 |
| 6,442,304 B1 * | 8/2002 | Crawley et al. | 385/12 |
| 2003/0062157 A1 * | 4/2003 | Ahmed et al. | 166/242.6 |
| 2003/0192707 A1 * | 10/2003 | Guven et al. | 166/380 |

FOREIGN PATENT DOCUMENTS

EP      45239 A1 * 2/1982

* cited by examiner

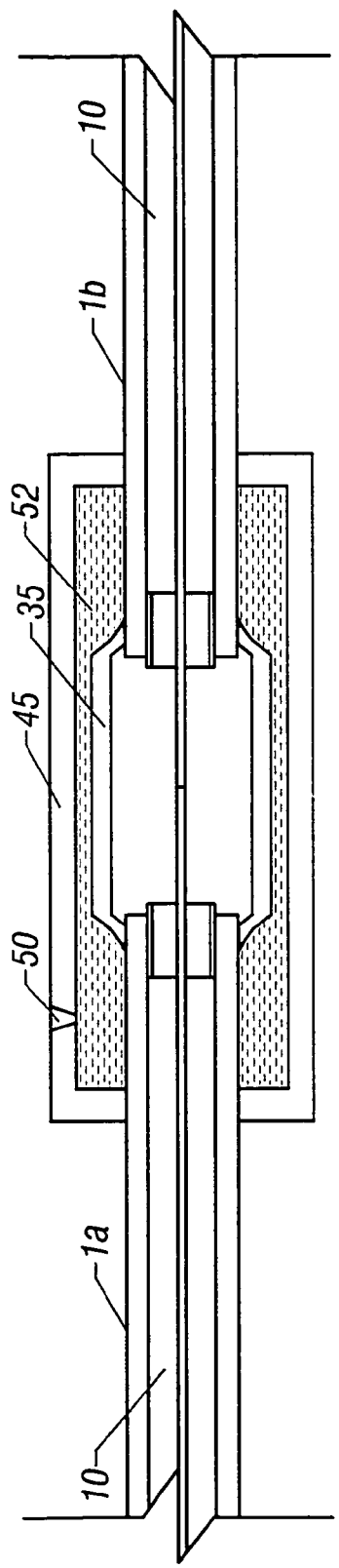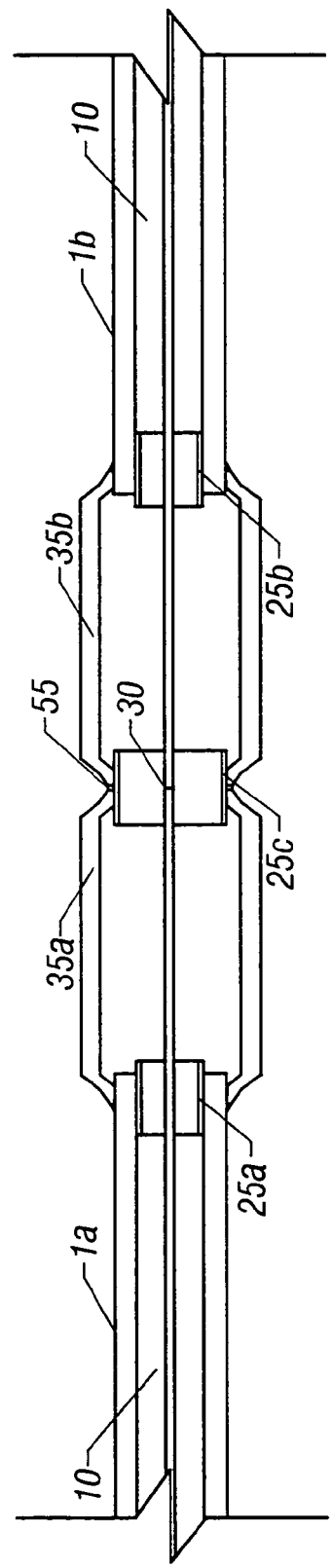

(FIELD WELDABLE CONNECTIONS)

FIELD WELDABLE CONNECTIONS

This application is a continuation of U.S. application Ser. No. 09/970,353, filed on Oct. 3, 2001, now U.S. Pat. No. 6,886,638.

FIELD OF THE INVENTION

More specifically, the subject matter of the present invention relates to an apparatus and method of protecting and sealing spliced communication lines.

BACKGROUND OF THE INVENTION

Communication lines are used in a wide range of applications in the oilfield industry. The communication lines transmit monitored data regarding downhole conditions such as temperature and pressure to surface instrumentation. The communication lines can also be used to send information down the well from the surface. Additionally, communication lines may also be used to electrically power downhole equipment. Communication lines may include electrical conduits, optical fibers and other methods for data or power transmission.

In environments such as those encountered in downhole wells the communication lines are exposed to hostile conditions such as elevated temperatures and pressures. To protect the fragile communication lines from the hostile conditions the communication lines are generally carried within protective tubing that provides an environmental seal. Problems arise when the seal must be broken during assembly, installation and/or repair of the communication line. For example, in downhole applications, in order for the communication line to be fed through production equipment such as packers, the line must be cut and then spliced with the downstream line. Thus, after splicing, the communication line must once again be sealed from the harsh environment.

There exists, therefore, a need for an apparatus and method of splicing communication lines that provides structural integrity and protects the communication line from the surrounding environment.

BRIEF DESCRIPTION OF THE DRAWINGS

FIG. 5 is a sketch of another embodiment of the welded splice assembly having a gel or epoxy material within the pressure housing.

FIG. 6 is a sketch of another embodiment of the welded splice assembly having a plurality of weld couplings.

DETAILED DESCRIPTION OF PREFERRED EMBODIMENTS

In the following detailed description of the subject matter of the present invention, the apparatus and method of splicing communication lines is principally described with reference to downhole well applications. Such description is intended for illustration purposes only and is not intended to limit the scope of the present invention. In addition to downhole well applications, the present invention can be used with any number of applications such as pipeline monitoring, subsea well monitoring, and data transmission, for example. Furthermore, the communication lines may comprise electrical wiring, which may facilitate transfer of information, power, or both. All such types of communication line splicing are intended to fall within the purview of the present invention. However, for purposes of illustration, the present invention will be principally described as being used in downhole well applications. Further as used herein, the term communication line shall refer to those lines comprising electrical lines or fiber optic lines, as well as lines including combinations thereof or combinations with other types of lines.

Figure 1:
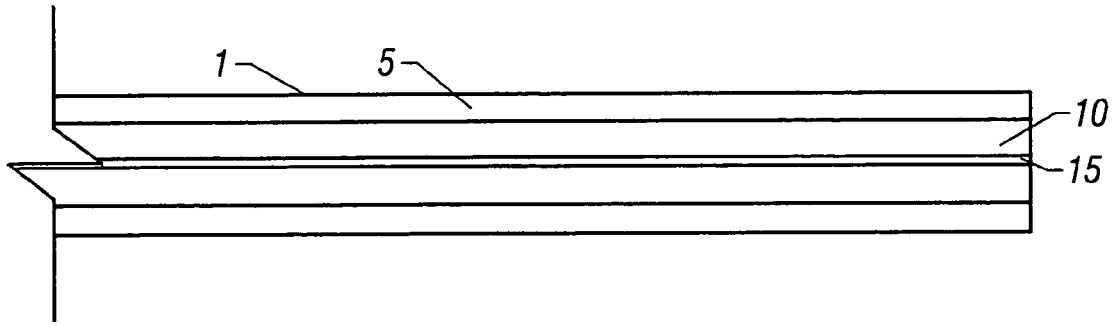
FIG. 1 is a sketch of a communication cable.

FIG. 1 provides a sketch of a typical cable 1 useful in the present invention. The cable 1 comprises an outer housing 5, a secondary housing 10, and one or more communication lines 15. The outer housing 5 provides the structural integrity for the communication line 1 and protects the communication lines 15 from the surrounding environment. Further, the outer housing 5 provides structural protection for the communication lines 15 from damage caused by the cable 1 impacting, or being impacted by, nearby tools and equipment. In one embodiment, the outer housing 5 is comprised of a metallic material such as steel, or other metallic alloys, for example. The secondary housing 10 resides within the outer housing 5 and provides protection for the communication lines 15 contained within. In one embodiment, shown in FIG. 1, the secondary housing 10 is made from a polymeric material.

Figure 2:
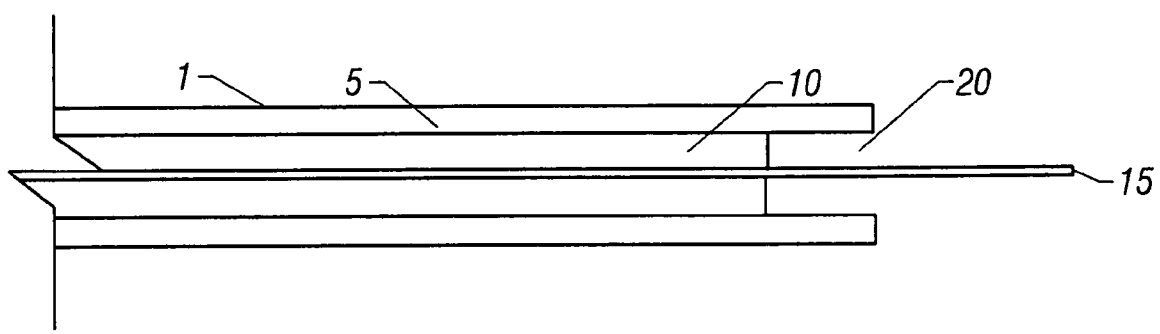
FIG. 2 is a sketch of a section of cable that has been prepared for splicing.

FIG. 2 provides a sketch of a segment of cable that has been prepared for splicing. The cable 1 has been cut so that the communication line 15 extends longitudinally beyond the outer housing 5 and the secondary housing 10. Afterwards, a portion of the secondary housing 10 is removed in order to create a void 20, which is defined by the outer housing 5 and the secondary housing 10.

Figure 3:
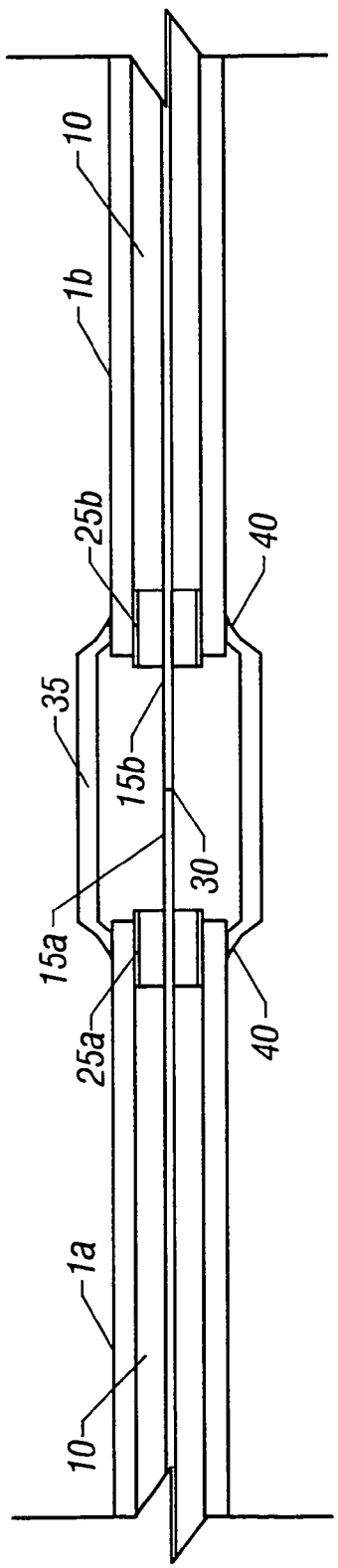
FIG. 3 is a sketch of the welded splice assembly.

FIG. 3 provides a sketch illustrating the communication line splice of the present invention. In FIG. 3, the two communication lines being spliced are designated 15a and 15b. Once the cables 1a, 1b have been prepared for splicing, thermal insulators 25a, 25b are inserted into the void 20 (shown in FIG. 2) so that the insulators 25a, 25b lie between the outer housing 5 and the communication lines 15a, 25b. The insulators 25a, 25b protect the communication lines 15a, 15b from the heat of the welding. Additionally, the insulators 25a, 25b prevent the secondary housing from melting and outgassing, which can result in Spoor weld quality. Prior to splicing, a weld coupling 35 is slid over one of the cables 1a, 1b. The cleaved communication lines 15a, 15b are then spliced together by conventional techniques, such that the communication lines 15a, 15b are operatively connected at the splice 30. The weld coupling 35 is then slid to cover the ends of both cables 1a, 1b, and the weld coupling 35 is secured in place by welds 40. In one embodiment the welds 40 are formed using an orbital welder. Once welded, the weld coupling 35 protects the splice 30 from corrosion, erosion, and physical damage resulting from environmental and operational conditions. Additional protection is provided against hydrocarbon darkening resulting from contact with conductive fluid.

Figure 4:
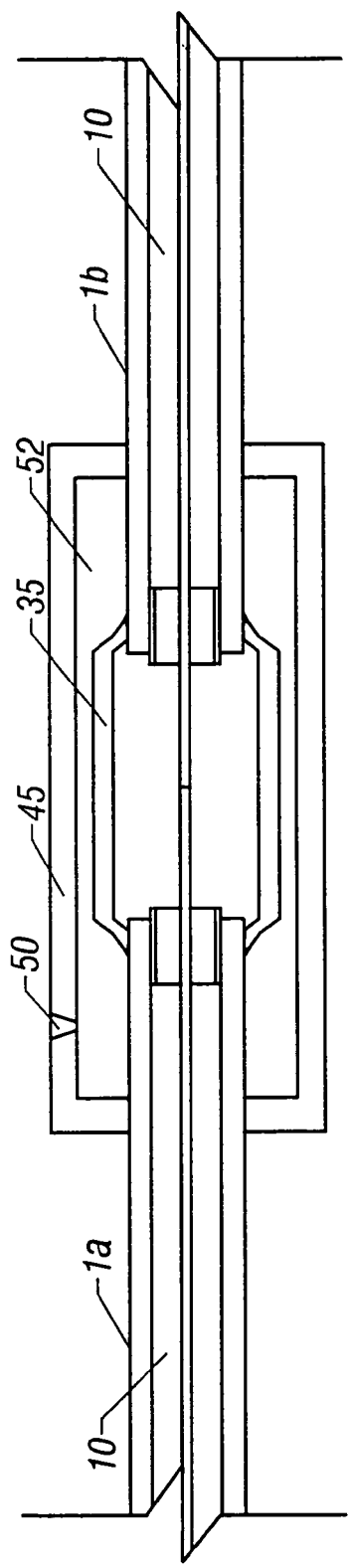
FIG. 4 is a sketch of another embodiment of the welded splice assembly having a pressure housing.

FIG. 4 provides a sketch of another embodiment of the weld assembly. In this embodiment, a pressure housing 45 fits over the weld coupling 35. The pressure housing 45 is slid over the same cable 1a, 1b as the weld coupling 35, but is slid prior to the sliding of the weld coupling 35. After splicing and after the weld coupling 35 is secured in place, the pressure housing 45 is attached to the cables 1a, 1b such that the weld coupling 35 is isolated from environmental conditions. For example the housing may be attached by welding, ferrules, or elastomeric seals, among other means. A port 50, located in the pressure housing 45 enables pressure testing of the welded assembly.

FIG. 5 provides a sketch of another embodiment of the weld assembly. In this embodiment a gel or epoxy material is pumped through the port into a cavity 52 defined by the pressure housing 45, the cables 1a, 1b, and the weld coupling 35. This fluid is used for pressure testing. The fluid is pumped into the cavity 52 at a high pressure, and the welded splice assembly is monitored for signs of failure. After pumping, the port 50 is plugged to seal in the viscous fluid. When the spliced section of cable is installed downhole, the viscous fluid cures and hardens due to the high downhole temperatures. The cured material thus provides additional protection for the splice 30 against erosion, corrosion, and other environmental conditions.

FIG. 6 provides a sketch of another embodiment of the weld assembly having a plurality of weld couplings 35a, 35b. The embodiment shown in FIG. 6 shows two couplings, but any number can be used and remain within the purview of the invention. The first weld coupling 35a is slid over the first cable 1a and the second weld coupling 35b is slid over the second cable 1b. An additional thermal insulator 25c is inserted to protect the splice 30 at the housing junction 55. After the cables 1a, 1b are spliced, the first weld coupling 35a is welded to the first cable 1a and the second weld coupling 35b is welded to the second cable 1b. The first weld coupling 35a is then welded to the second weld coupling 35b at the housing junction 55, thereby enclosing the splice 30. In this manner, both welds near the secondary housing 10 are formed prior to the weld couplings 35a, 35b being sealed to the surrounding environment. Thus, any resulting outgassing of the secondary housing 10 is able to escape to the environment and does not affect the weld quality.

Figure 7:
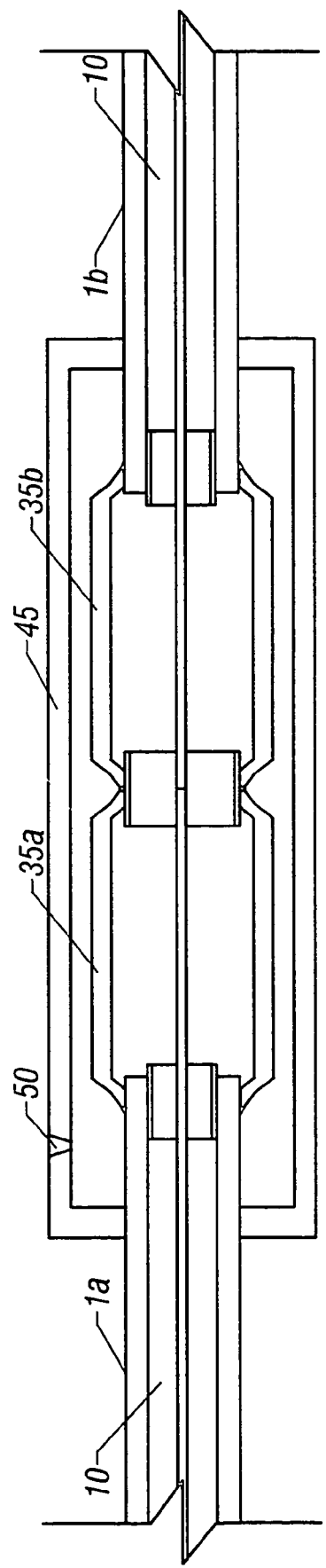
FIG. 7 is a sketch of another embodiment of the welded splice assembly having a plurality of weld couplings and a pressure housing.

FIG. 7 provides a sketch of another embodiment of the weld assembly. In this embodiment, the pressure housing 45 protects the two weld couplings 35a, 35b against erosion and other damaging environmental conditions. The pressure housing 45, through its port 50, enables testing of the welded connections with a standard fluid for pressure testing, such as hydraulic oil, or by a different viscous fluid, such as a gel or epoxy material.

Figure 8:
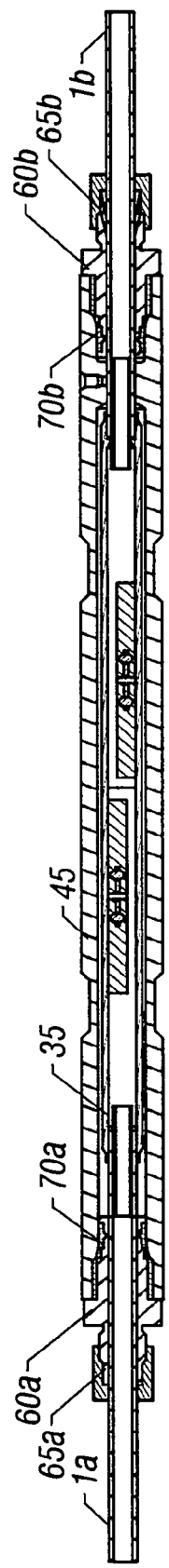
FIG. 8 is a sketch of another embodiment of the welded splice assembly.

FIG. 8 provides a sketch of another embodiment of the pressure housing 45. In this embodiment, the pressure housing 45 is attached to the cables 1a, 1b by means of fittings 60a, 60b. The first fitting 60a and the pressure housing 45 are slid over the first cable 1a. The second fitting 60b is slid over the second cable 1b. After splicing, the fittings 60a, 60b and the pressure housing 45 are positioned such that the weld coupling 35 is contained within the pressure housing 45. The fittings 60a, 60b are then tightened, thereby sealing the welded connections inside the pressure housing 45. The fittings 60a, 60b in this embodiment seal to the cables 1a, 1b through a dual ferrule systems 65a, 65b. The fittings 60a, 60b seal onto the pressure housing 45 by means of elastomeric seals 70a, 70b. These sealing mechanisms 65a, 65b, 70a, 70b are not the only means by which the seals can be made. All mechanisms by which one could sealingly join the pressure housing 45 and the cables 1a, 1b are intended to fall within the purview of the present invention.

Figure 9:
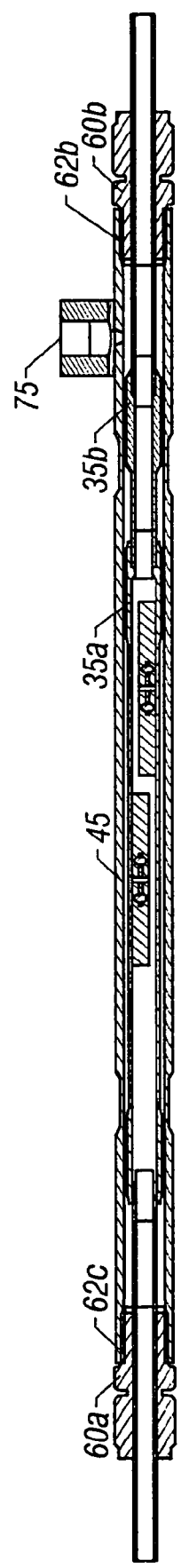
FIG. 9 is a sketch of another embodiment of the welded splice assembly having a plurality of weld couplings.

FIG. 9 provides a sketch of another embodiment of the splice assembly. In this embodiment, the fittings 60a, 60b are connected to pressure housing 45 by means of sealing pipe threads 62b, 62c. A removable port 75 is used to pressure test the welded splice assembly.

Figure 10:
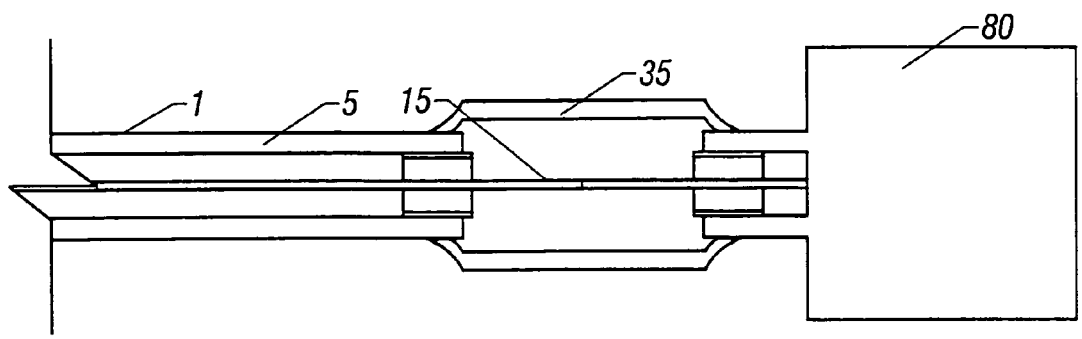
FIG. 10 is a sketch of another embodiment of the welded splice assembly attached to a tool.

FIG. 10 provides a sketch of another embodiment of the splice assembly. In this embodiment, communication line 15 is spliced to a downhole tool 80. The weld coupling 35 is welded to the outer housing 5 on one side and a section of the tool 80 on the opposite side.

Figure 11:
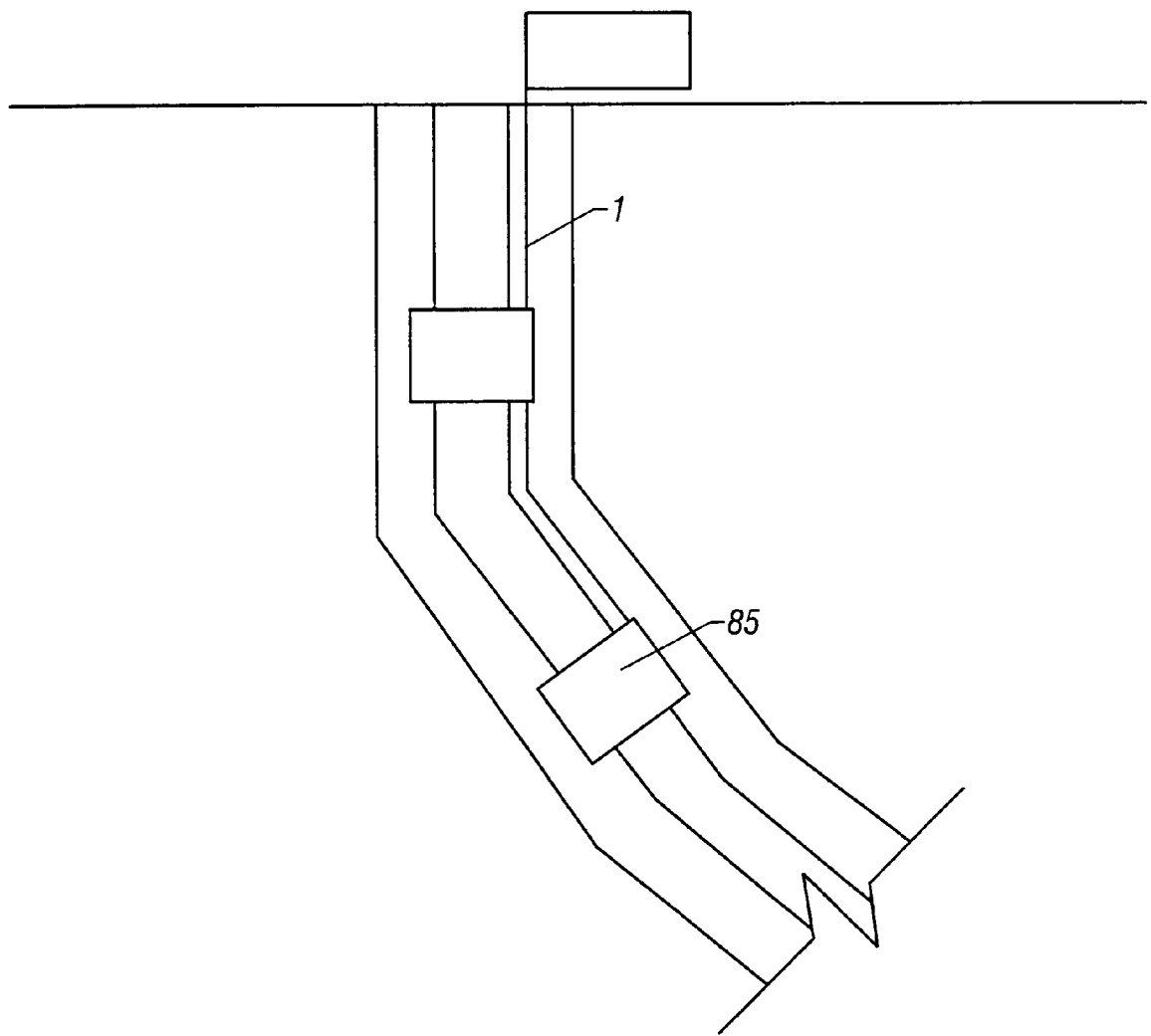
FIG. 11 is a sketch of a wellbore completion including a spliced communication line.

FIG. 11 provides a sketch of a wellbore completion including a spliced communication line. The cable 1 is installed downhole to communicate with or power a piece of downhole equipment 85. The equipment 85 may be controlled by a controller located at the surface.

Figure 12:
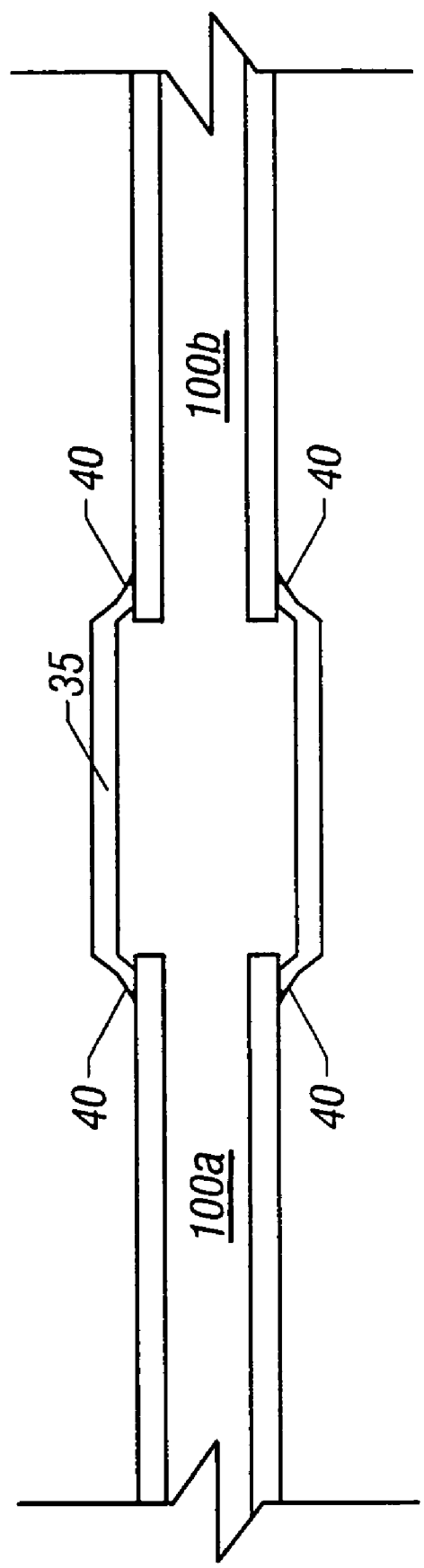
FIG. 12 provides a sketch of the welded splice assembly used for a hydraulic or fluid conduit.

FIG. 12 provides a sketch of the welded splice assembly used for a hydraulic or fluid conduit. In FIG. 12, a weld coupling 35 is secured over the spliced hydraulic or fluid conduits 100a, 100b by welds 40. Once welded, the resulting spliced hydraulic or fluid line can be pressure tested prior to placement downhole.

The invention being thus described, it will be obvious that the same may be varied in many ways. Such variations are not to be regarded as a departure from the spirit and scope of the invention and all such are intended to be included within the scope of the following non-limiting claims:

What is claimed is:

1. An apparatus comprising:
   a weld coupling adapted to be welded to an outer housing of a first cable segment to couple the first cable segment to a second cable segment; and
   a thermally insulative material adapted to prevent thermal damage to a communication line of the first cable segment when the weld coupling is welded to the outer housing.

2. The apparatus of claim 1, wherein the thermally insulative material contacts the outer housing and contacts the communication line.

3. The apparatus of claim 1, further comprising:
   an insulating material separate from the thermally insulative material and located between the outer housing and the communication line to protect the communication line, the insulating material being displaced by the thermally insulative material near the weld coupling to prevent thermal damage to the insulating material when the weld coupling is welded to the outer housing.

4. The apparatus of claim 3, wherein the insulating material contacts the outer housing and the communication line, and the thermally insulative material contacts the outer housing and the communication line.

5. The apparatus of claim 3, wherein the insulating material comprises a polymeric material.

6. The apparatus of claim 3, wherein the insulating material transverses an axial length of the first cable segment except where the insulating material is displaced by the thermal insulator.

7. The apparatus of claim 3, wherein the thermally insulative material is adapted to prevent at least one of melting and outgasing of the insulating material.

8. The apparatus of claim 3, wherein the thermally insulative material is located closer to the weld than to the insulating material.

9. The apparatus of claim 1, wherein the weld coupling comprises a sleeve approximately centered where the communication line contacts another communication line of the second cable segment.

10. The apparatus of claim 1, further comprising:
a thermal insulator adapted to prevent thermal damage to a communication line of the second cable segment.

11. A method comprising:
providing a weld coupling adapted to be welded to a first cable segment and a second cable segment to couple the first and second cable segments together; and
using a thermally insulative material to prevent thermal damage to a communication line of the first cable segment when the weld coupling is welded to at least one of the first cable segment and the second cable segment.

12. The method of claim 11, wherein the using comprises:
positioning the thermally insulative material between an outer housing of the first cable segment and the communication line.

13. The method of claim 12, wherein the thermally insulative material contacts the outer housing and the communication line.

14. The method of claim 12, wherein the outer housing is adapted to be welded to the weld coupling.

15. The method of claim 11, further comprising:
preventing damage to a polymeric material that surrounds the communication line when the weld coupling is welded to the outer housing of the first cable segment.

16. The method of claim 15, further comprising:
displacing the polymeric material near the weld coupling with another material to prevent thermal damage to the polymeric material.

17. The method of claim 11, wherein the using comprises:
preventing thermal damage to the communication line during the formation of a metal weld between the weld coupling and the outer housing of the first cable segment.

18. The method of claim 11, further comprising:
preventing thermal damage to a communication line of the second cable segment when the weld coupling is welded to the second cable segment.

19. The method of claim 18, wherein the using the thermally insulative material to prevent thermal damage to the communication line of the first cable segment and the preventing of thermal damage to the communication line of the second cable segment comprises:
using separate thermal insulators to protect the communication lines of the first and second segments.

* * * * *